United States Patent
Matsui (10) Patent No.: US 9,548,152 B2
(45) Date of Patent: Jan. 17, 2017

(54) REDUNDANT CURRENT-SUM FEEDBACK ACTUATOR

(71) Applicant: The Boeing Company, Chicago, IL (US)

(72) Inventor: Gen Matsui, Bothell, WA (US)

(73) Assignee: The Boeing Company, Chicago, IL (US)

(*) Notice: Subject to any disclaimer, the term of this patent is extended or adjusted under 35 U.S.C. 154(b) by 8 days.

(21) Appl. No.: 14/803,392

(22) Filed: Jul. 20, 2015

(65) Prior Publication Data

US 2015/0325353 A1   Nov. 12, 2015

Related U.S. Application Data

(63) Continuation of application No. 13/942,710, filed on Jul. 16, 2013, now Pat. No. 9,117,579.

(51) Int. Cl.

| | | |
|---|---|---|
| *H01F 7/06* | (2006.01) | |
| *B64C 13/50* | (2006.01) | |
| *B64C 13/16* | (2006.01) | |
| *B64C 19/00* | (2006.01) | |
| *B64C 13/42* | (2006.01) | |

(52) U.S. Cl.
CPC ............ *H01F 7/064* (2013.01); *B64C 13/16* (2013.01); *B64C 13/42* (2013.01); *B64C 13/50* (2013.01); *B64C 13/503* (2013.01); *B64C 19/00* (2013.01); *B64C 2013/506* (2013.01)

(58) Field of Classification Search
CPC .................................................. H01F 7/064
USPC ................................. 318/560, 34, 558
See application file for complete search history.

(56) References Cited

U.S. PATENT DOCUMENTS

| | | | |
|---|---|---|---|
| 5,789,887 A * | 8/1998 | Elischewski | G05B 19/0428 318/286 |
| 5,806,805 A | 9/1998 | Elbert et al. | |
| 5,952,806 A | 9/1999 | Muramatsu | |
| 7,984,878 B2 | 7/2011 | Hirvonen | |
| 2012/0303210 A1 | 11/2012 | Matsui | |
| 2013/0026287 A1 | 1/2013 | Goupil et al. | |

OTHER PUBLICATIONS

Extended European Search Report EP14174801 mailed Jan. 27, 2015.

* cited by examiner

*Primary Examiner* — David S Luo
(74) *Attorney, Agent, or Firm* — McDonnell Boehnen Hulbert (57) ABSTRACT

A system and methods for redundant current-sum feedback control of an actuator system is presented. An actuator comprises actuation coils configured to actuate the actuator, and an actuation coil current sensor senses a measured total coil current comprising a sum of coil currents of each of the actuation coils. Actuator coil controllers control the actuation coils based on a commanded total coil current and the measured total coil current.

20 Claims, 8 Drawing Sheets

FIG. 3
EXISTING ART

REDUNDANT CURRENT-SUM FEEDBACK ACTUATOR

CROSS-REFERENCE TO RELATED APPLICATIONS

The present application is a continuation of U.S. patent application Ser. No. 13/942,710, filed Jul. 16, 2013, entitled "Redundant Current-Sum Feedback Actuator, the entire contents of which are hereby incorporated by reference.

FIELD

Embodiments of the present disclosure relate generally to suppression of failure in electrical-mechanical control systems. More particularly, embodiments of the present disclosure relate to suppression of failure in actuation systems.

BACKGROUND

A flight path of an airplane is controlled by a deflection of flight control surfaces. In many modern airplanes, flight control surfaces are deflected by actuator(s). Such flight control surfaces may include elevators for pitch control, ailerons and flaperons for roll control, and a rudder for yaw control. In many cases, electric current controls output of the actuator. In some cases, an electromagnetic effect of the electric current directly produces a mechanical output for Electro-Mechanical Actuator (EMA), or Electro-Hydrostatic Actuator (EHA), while in other cases, it is amplified by some other means, such as through controlling the hydraulic flow through a servo valve such as a Direct-Drive Valve (DDV), or Electrohydraulic Servo Valve (EHSV) in single or multiple stages.

Electric current flows through a coil (or coils) and is converted to a magnetically induced useable force to actuate the actuator. A non-optimality causing an erroneous level of current could cause the actuator to move to an un-commanded position or output an un-commanded force. Such a non-optimality may cause an airplane to deviate from a commanded path and/or cause structural anomaly to the airplane, particularly if the non-optimality is oscillatory or cyclic.

SUMMARY

A system and methods for redundant current-sum feedback control of an actuator system is presented. An actuator comprises actuation coils configured to actuate the actuator, and an actuation coil current sensor senses a measured total coil current comprising a sum of coil currents of each of the actuation coils. Actuator coil controllers control the actuation coils based on a commanded total coil current and the measured total coil current.

In this manner, an effect of electrical non-optimality is suppressed to a negligible level. Embodiments architecturally suppress an effect of electrical non-optimality in one of redundant control loops, regardless of characteristics of the non-optimality. Therefore, the architecture alleviates a need for tasks such as custom analysis/tuning of elaborate monitors, and avoids effects to schedule and certification. Furthermore, application of less costly devices becomes possible.

In an embodiment, a redundant current-sum feedback actuator system comprises an actuator, an actuation coil current sensor, and actuator coil controllers. The actuator comprises actuation coils configured to actuate the actuator. The actuation coil current sensor sense a measured total coil current comprising a sum of coil currents of each of the actuation coils. The actuator coil controllers control the actuation coils based on a difference between a commanded total coil current and the measured total coil current.

In another embodiment, a method for suppressing non-optimality in an actuator control system senses a measured total coil current comprising a sum of coil currents of actuation coils of an actuator with an actuation coil current sensor. The method further controls the actuation coils with at least two actuator coil controllers based on a difference between a commanded total coil current and the measured total coil current.

In a further embodiment, a redundant current-sum feedback actuator controller comprises an inner feedback control loop that receives a desired total coil current and a measured total coil current comprising a sum of coil currents of each of a plurality of actuation coils of an actuator. The inner feedback control loop also controls the actuation coils based on a difference between a commanded total coil current and the measured total coil current.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to control laws, control systems, measurement techniques, measurement sensors, actuators, data transmission, signaling, network control, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, suppressing fault in an actuator for an aircraft flight control surface. Embodiments of the disclosure, however, are not limited to such aircraft structure, and the techniques described herein may also be utilized in other applications. For example but without limitation, embodiments may be applicable to manned and unmanned ground, air, space, water and underwater vehicles, windmills, or other machinery.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
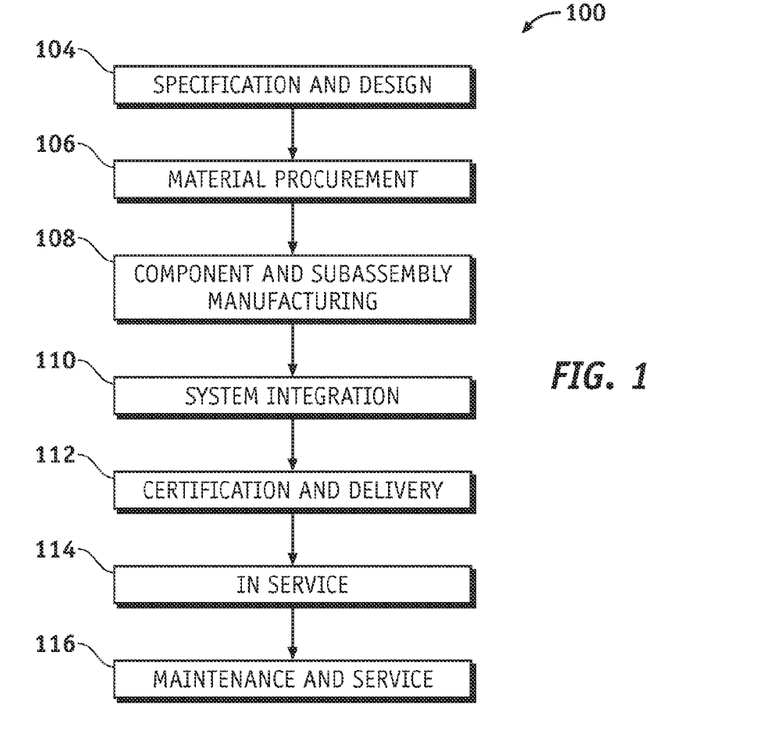
FIG. 1 is an illustration of a flow diagram of an exemplary aircraft production and service methodology.
Figure 2:
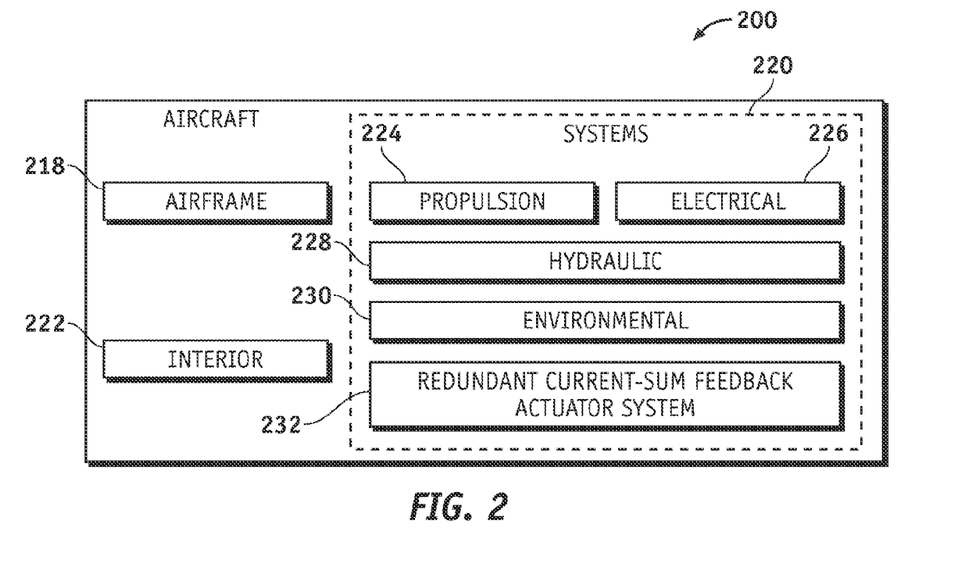
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing process 108 (production stage 108) and system integration 110 (production stage 110) of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization, and the like.

As shown in FIG. 2, the aircraft 200 (aircraft 200) produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a redundant current-sum feedback actuator system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production stage 108 may be fabricated or manufactured in a manner similar to components or subassemblies produced while the aircraft 200 is in service. In addition, one or more apparatus embodiments, method embodiments, or a combination thereof may be utilized during production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Flight control surfaces are deflected by actuator(s) (hydraulically or electrically powered) to ultimately control a flight path. Such flight control surfaces may comprise, for example but without limitation, elevators for pitch control, ailerons and flaperons for roll control, rudder for yaw control, or other flight control surface. There are often multiple actuators attached to a single flight control surface in parallel, and in many cases, they may all be activated in normal conditions. There are control mechanisms (e.g., electronic, mechanical) that control a deflection to which each actuator positions the flight control surface. In normal conditions, the actuators on a single/same surface work in unison to deflect the flight control surface to the commanded position. However, an anomaly in an actuator or its controller may cause the affected actuator ("non-optimal actuator") to try to deflect the flight control surface to a position other than the commanded position.

Embodiments of the disclosure provide a system and methods wherein flux summing in a servo valve and a current-sum feedback loop (the "current sum" or the total current flowing through multiple coils) is used as a feedback parameter in each of multiple actuator controllers to achieve a near-perfect fault suppression capability. "current sum" may refer to a sum of currents, and thus current sum, sum of currents and total current may be used interchangeably in this document.

Figure 3:
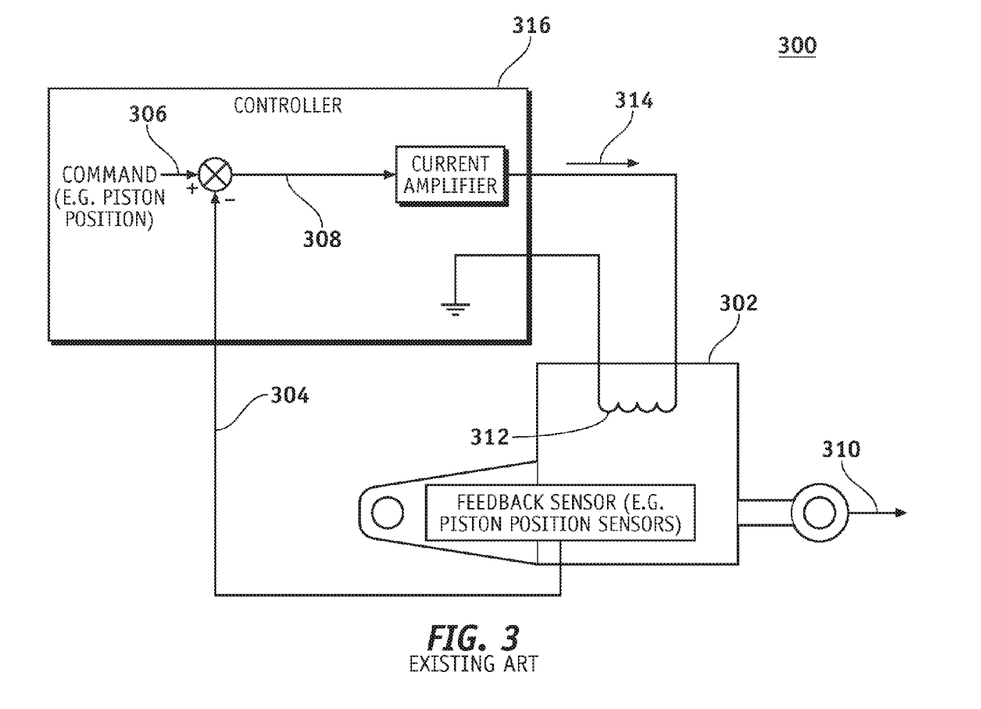
FIG. 3 is an illustration of an existing actuator.

FIG. 3 is an illustration of an existing actuator controller 300. An actuator output 310 of a conventional actuator 302 is controlled by a difference 308 between a desired output 306 (command 306) and a measured output 304 (feedback 304). Piston position 310 is one example of the actuator output 310 that may be controlled in this way. The difference 308 between the command 306 and the feedback 304 is used to determine an appropriate control electric current 314 to drive the feedback 304 closer to the command 306. The actuator controller 316 shows a case in which the control electric current 314 output is set proportional to the difference 308, but there are many other control methods available. The control electric current 314 is converted to mechanical output in a variety of ways as discussed above.

Figure 4:
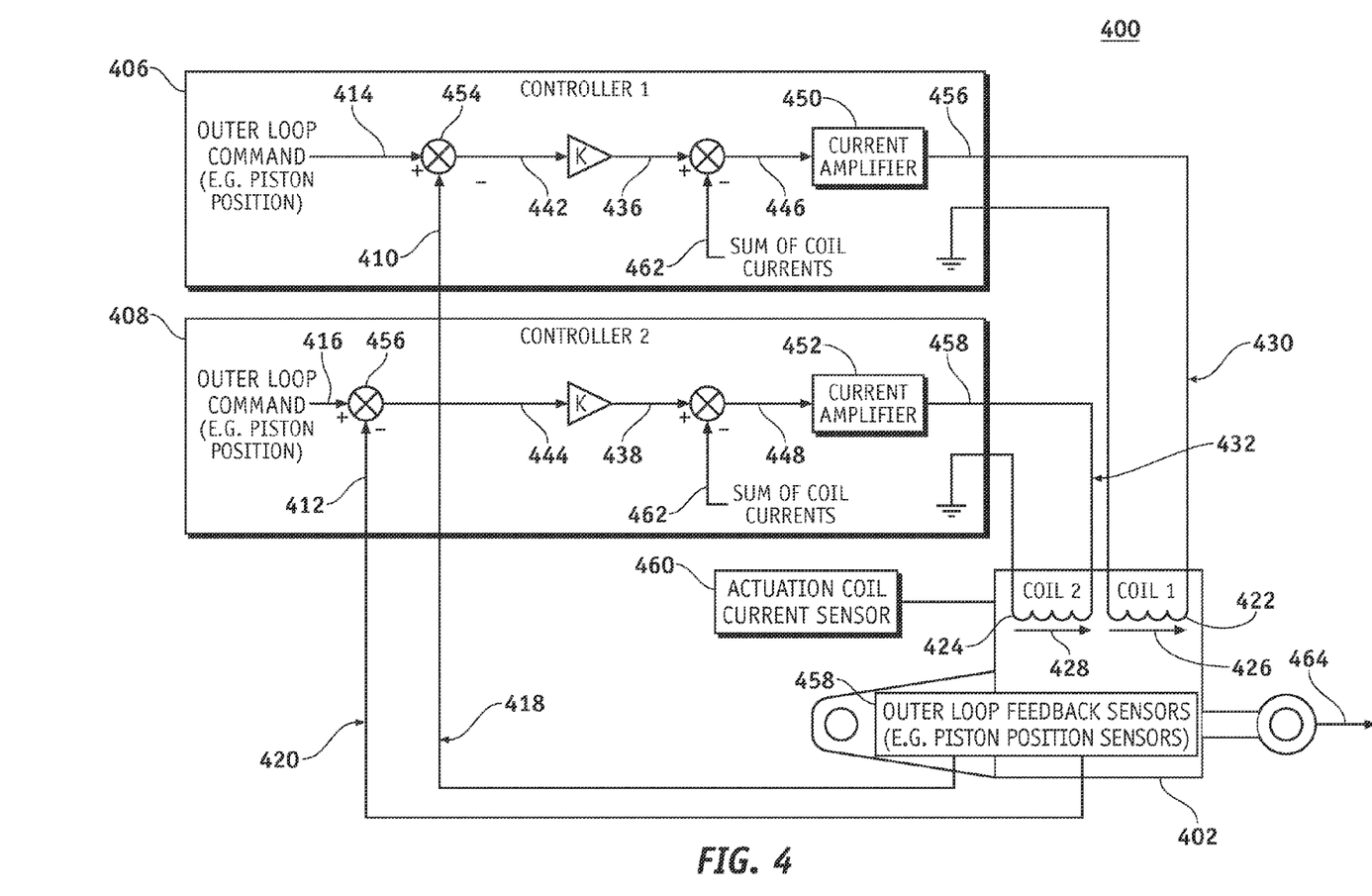
FIG. 4 is an illustration of an exemplary parallel dual actuator controller with total current inner loop according to an embodiment of the disclosure.

FIG. 4 is an illustration of an exemplary parallel dual actuator controller system 400 with total current inner loop according to an embodiment of the disclosure. As with the conventional actuator 302, an output of an actuator 402 is controlled through feedback control, where a measured output 410/412 (feedback 410/412) is compared against a desired output 414/416 (command 414/416) respectively. In this case, a feedback control loop 418 and 420 are referred to as the "outer feedback control loop 418 and outer feedback control loop 420" and are electrically independent outer control loops 418/420. In this document, a measured output and a measured actuator position may be used interchangeably. Similarly, in this document, a desired output, a command, and a desired actuator position may be used interchangeably.

The system 400 comprises the actuator 402, an actuator coil controller 1 (406), an actuator coil controller 2 (408), an actuation coil current sensor 460, and an outer loop feedback sensor 458.

The actuator 402 comprises a plurality of actuation coils such as an actuation coil 1 (422) and an actuation coil 2 (424) configured to actuate the actuator 402. The actuation coils 422/424 comprise a common actuation power.

The actuation coil current sensor 460 is configured to sense a measured total coil current 462 comprising a sum of coil currents 426 and 428 of the actuation coil 1 (422) and the actuation coil 2 (424). The actuation coil current sensor 460 is explained in more detail in the context of discussion of FIGS. 8-10 below.

The actuator coil controller 1 (406) and the actuator coil controller 2 (408) are configured to control the actuation coil 1 (422) and an actuation coil 2 (424) respectively based on a commanded total coil current 436/438 and the measured total coil current 462.

One difference in the control system 400 compared to the existing actuator controller 300 is that there are multiple independently driven actuation coils namely the actuation coil 1 (422) and the actuation coil 2 (424), and the coil current 426 through the actuation coil 422 and the coil current 428 through the actuation coil 424 are controlled independently by the actuator coil controller 1 (406) and the actuator coil controller 2 (408) respectively.

Another difference is that each control path comprises, an inner feedback control loop 430 and an inner feedback control loop 432 respectively, in addition to their respective outer feedback control loop 418 and outer feedback control loop 420. A control parameter for the inner feedback control loop 430/432 is the measured total coil current 462. The measured total coil current 462 is a sum of the coil currents 426 and 428 or a "current sum" or a total current flowing through the multiple actuation coils 422/424 as the feedback parameter in each of the multiple actuator coil controllers 406/408. Thus, measured total coil current, measured total current sum, current sum value, and current-sum feedback value may be used interchangeably in this document.

The outer feedback control loop 418 determines the desired current sum 436 (commanded total coil current 436, or a desired value 436) based on a difference 442 between the desired actuator output 414 and the measured actuator output 410. The inner feedback control loop 430 (fed back through the actuation coil current sensor 460 and through the sum of coil currents 462) determines an appropriate command 446 (command output 446) to its current amplifier 450 based on a current-sum difference between the commanded total coil current 436 (desired total coil current 436, or desired value 436) and the measured total coil current 462 and generates the command output 446 to control the actuator 402.

Similarly, the outer feedback control loop 420 determines the commanded total coil current 438 (desired total coil current 438) based on a difference 444 between the desired actuator output 416 and the measured actuator output 412. The inner feedback control loop 432 (fed back through the actuation coil current sensor 460 and through the sum of coil currents 462) determines an appropriate command 448 (command output 448) to its current amplifier 452 based on a current-sum difference between the commanded total coil current 438 and the measured total coil current 462 and generates the command output 448 to control the actuator 402.

The desired total coil current 436/438 comprises an output current difference 454/456 between a desired actuator current output 414/416 and a measured actuator current output 418/420, and the command output 446/448 comprises a difference between the desired total coil current 436/438 and the measured total coil current 462.

The system 400 suppresses electrical non-optimality effects. An erroneous level of current may be output from one actuator coil controller 406/408 as a result of any of various anomaly modes and any number of anomaly modes, comprising those in actuator coil controller electronics, sensor, or devices within or external to the two control loops. Regardless of an origin of an anomaly, a current anomaly in one coil 422/424 directly affects the measured total coil current 462 that is applied as the inner loop feedback parameter in the other actuator coil controller 406/408. The actuator coil controller 406/408 then adjusts its current output in order to drive the current sum value 462 towards the desired value 436/438, and therefore, suppressing an effect on an actuator output 464. Because the actuator output 464 is dictated by the sum of the coil currents namely the measured total coil current 462, the system 400 architecturally suppresses an effect of electrical non-optimality anywhere in one of the redundant control loops 418/420 and 430/432, regardless of characteristics of the non-optimality.

While a dual-redundant architecture has been discussed above, any redundancy (e.g., triple, quadruple, etc.) would suppress an effect of the non-optimality, with a degree of efficacy increasing with a level of redundancy.

Figure 5:
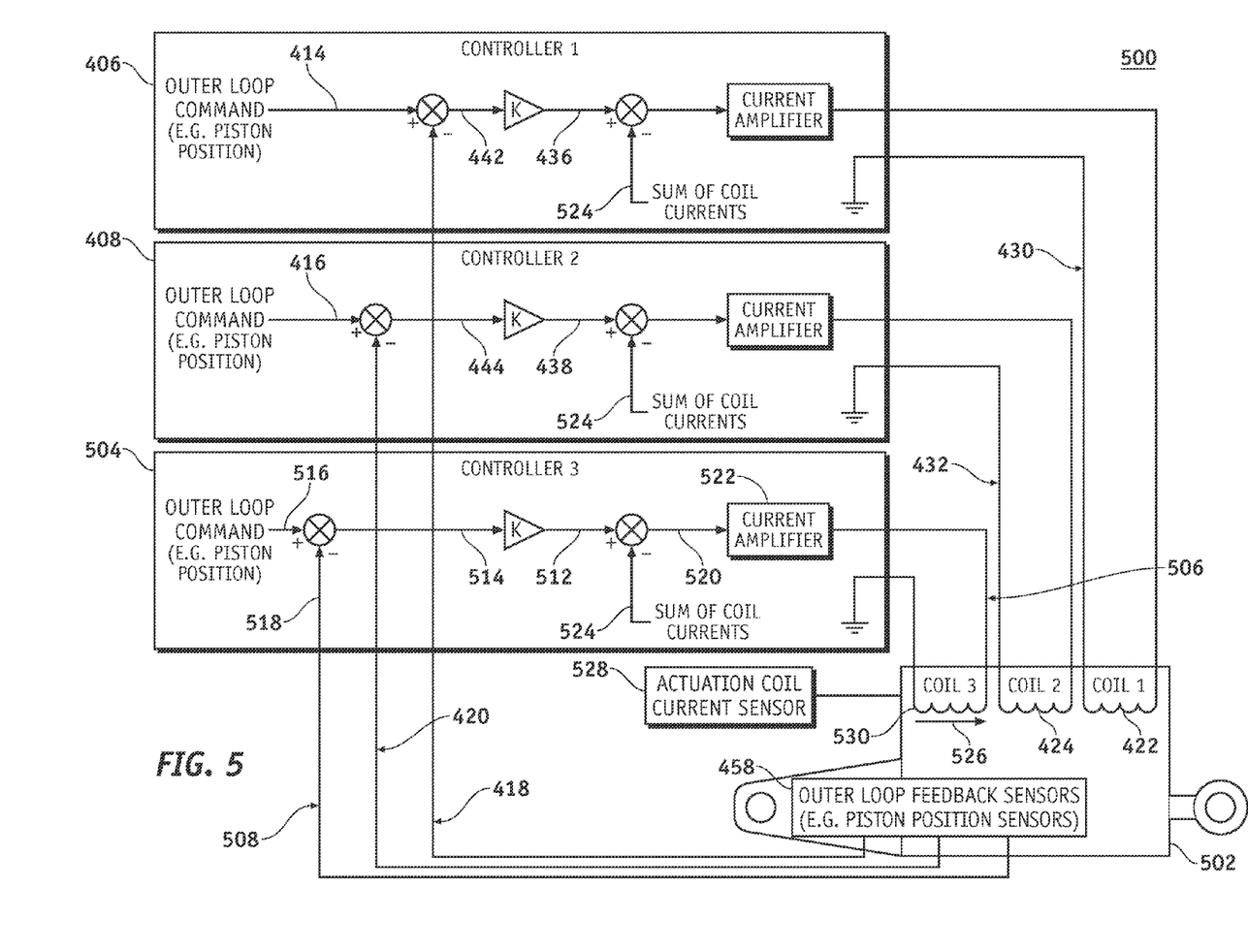
FIG. 5 is an illustration of an exemplary parallel triplex actuator controller with total current inner loop according to an embodiment of the disclosure.

FIG. 5 is an illustration of an exemplary parallel triplex actuator coil controller system 500 (system 500) with total current inner loop according to an embodiment of the disclosure. System 500 is described herein in conjunction with system 400. System 500 may have functions, material, and structures that are similar to the system 400. Therefore common features, functions, and elements may not be redundantly described here.

The actuation coil current sensor 528 is configured to sense a measured total coil current 524 comprising a sum of coil currents 426, 428 and 526 of the actuation coil 1 (422), the actuation coil 2 (424), and the actuation coil 3 (530). The actuation coil current sensor 528 is explained in more detail in the context of discussion of FIGS. 8-10 below.

The outer feedback control loop 418/420/508 determines a desired current sum 436/438/512 (commanded total coil current 436/438/512) based on a difference 442/444/514 between the desired actuator output 414/416/516 and the measured actuator output 410/412/518. The inner feedback control loop 430/432/506 determines an appropriate command 446/448/520 to its current amplifier 450/452/522 based on a difference between the commanded total coil current 436/438/512 and the measured total current sum 524 (measured total coil current 524). The measured total coil current 524 is the sum of the coil currents 426, 428, 526 or the "current sum" or the total current flowing through the multiple actuation coils 422/424/530 as the feedback parameter in each of the multiple actuator coil controllers 406/408/504.

Figure 6:
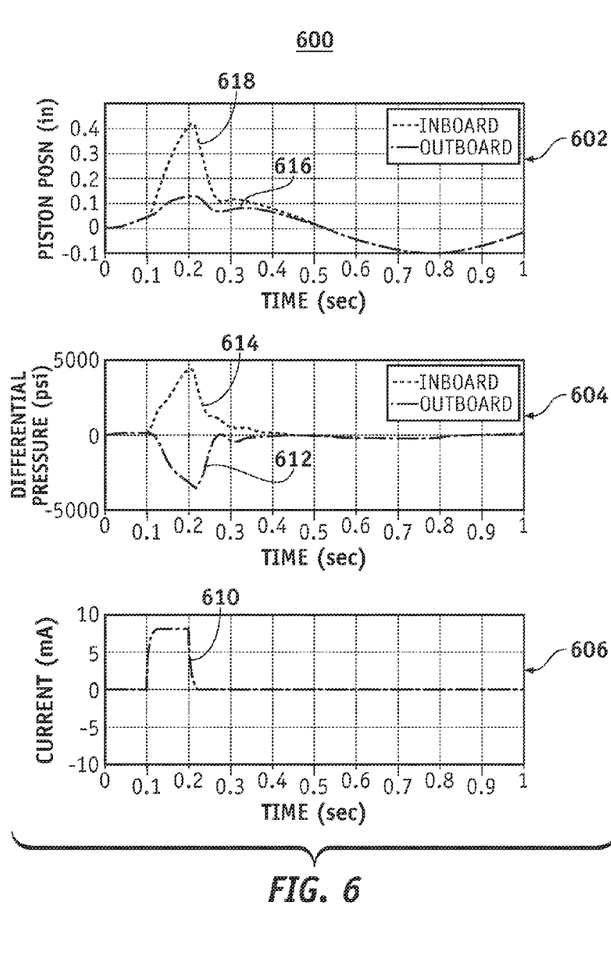
FIG. 6 is an illustration of an exemplary time-history plot showing piston position (in) plot, differential pressure (psi) plot, and current (mA) plot for a simulated fault in the conventional actuator of FIG. 3.

FIG. 6 is an illustration of an exemplary time-history plot 600 showing piston position (in) plot 602, differential pressure (psi) plot 604, and current (mA) plot 606 for a simulated fault in the conventional actuator 302 of FIG. 3. As shown by the plot 606, an erroneous current 610 through the actuation coil 312 of the conventional actuator 302 of FIG. 3 causes a large force fight between inboard and outboard actuators on a same aerodynamic surface as shown by the difference between the differential pressures 612 and 614 shown in the plot 604, as well as by the piston position displacement 616 and 618 shown in the plot 602 represented by a deviation from a desired sinusoidal command profile as shown in plot 702 of FIG. 7.

By the outer feedback control loop 418/420/508 determining a desired current sum 436/438/512 (commanded total coil current 436/438/512) based on the difference 442/444/514 between the desired actuator output 414/416/516 and the measured actuator output 410/412/518, and the inner feedback control loop 430/432/506 determining an appropriate command 446/448/520 to its current amplifier 450/452/522 based on a difference between the commanded total coil current 436/438/512 and the measured total coil current 524, system 500 provides unprecedented non-optimality suppression capability that is near-perfect. An example of this is shown in the time-history plot 700 below.

Figure 7:
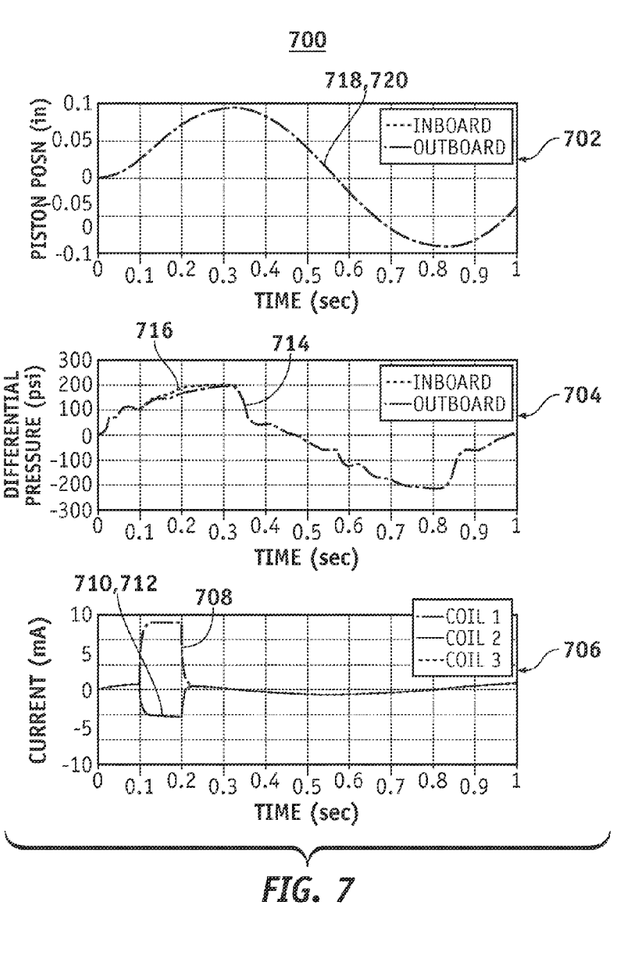
FIG. 7 is an illustration of an exemplary time-history plot showing piston position (in) plot, differential pressure (psi) plot, and current (mA) plot for a simulated fault suppression in the triplex actuator system of FIG. 5 according to an embodiment of the disclosure.

FIG. 7 is an illustration of an exemplary time-history plot 700 showing piston position (in) plot 702, differential pressure (psi) plot 704, and current (mA) plot 706 for a simulated fault suppression in the parallel triplex actuator coil controller system 500 of FIG. 5 according to an embodiment of the disclosure. When an erroneous level of control current 708 (erroneous current 708) flows through one actuator coil 422/424/530 within a servo valve a slight change in the measured total coil current 524 is sensed by the actuation coil current sensor 528 and the other two actuator coil controllers work to actively generate currents that immediately oppose the erroneous current 708 to keep the measured total coil current 524 at the commanded total coil current 436/438/512.

In this way, the effects of the erroneous current 708 is kept to negligible levels, as shown by a force fight represented by the difference between the differential pressures 714 and 716 shown in the plot 704, as well as by a piston position displacement 718 and 720 represented by the deviation from the desired sinusoidal command profile shown in the plot 702. This is contrasted to the extreme effects seen with "Conventional" actuators such as the conventional actuator 302 shown in FIG. 6.

More specifically in this example, the erroneous current 708 through the actuation coil 422 is substantially immediately opposed by the currents 710 and 712 through other two actuation coils, e.g., the actuation coil 2 (424) and the actuation coil 3 (530) respectively. Thus, the force fight as well as the piston position displacement between the inboard and the outboard actuators on the same aerodynamic surface are reduced to negligible levels.

Feedback control loop, puts into place a feature in which each control current directly affects the other control currents electromagnetically, such that an erroneous control current is actively and immediately opposed by the other control currents. Thus, when an anomaly in one or more of signals in one of lines of either feedback loops or in a device generating a signal such as the desired actuator output 414 representing the desired piston position causes the erroneous current 708 to flow through an actuation coil such as the actuation coils 422, the resulting magnetic flux 818/820 is sensed by the magnetic flux sensor 802/812 (FIG. 8, actuation coil current sensor 460/528 in FIGS. 4 and 5) in the other two lines of the position control loops. This, in turn, causes a current to flow in the other two actuation coils 424/526 and creates a magnetic flux 818/820 opposing that which is created by the erroneous current 708.

A difference in hydraulic pressure between two sides of cylindrical pistons, "differential pressure" may be substantially proportional to a load applied on or output by the actuator 402. This differential pressure is measured and monitored by a force sensor. The force sensor monitors at least two measured actuator forces. The system 400/500 may comprise other types of actuators such as an electro-mechanical actuator where a "differential pressure" may not be used to measure a force. In this case, other means of force measurement might be used such as, but without limitation, a strain gage, or other force measurement means.

Figure 8:
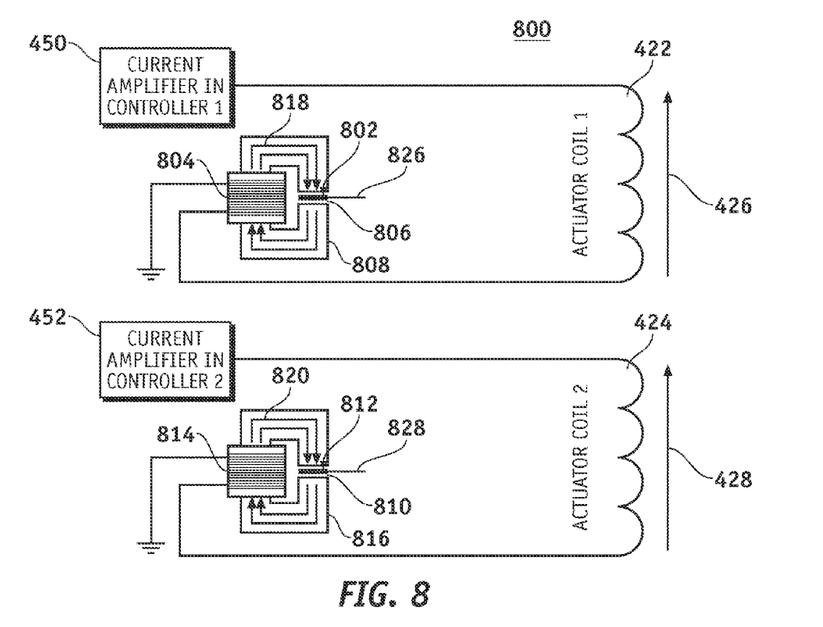
FIG. 8 is an illustration of an independent current measurement according to an embodiment of the disclosure.
Figure 9:
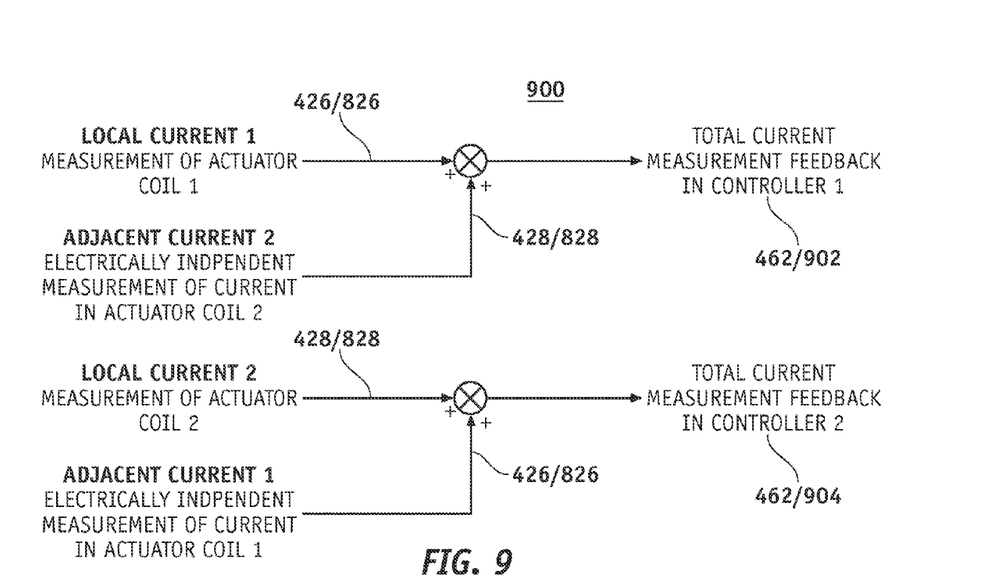
FIG. 9 is an illustration of total current derivation in the independent current measurement of FIG. 8 according to an embodiment of the disclosure.

FIG. 8 is an illustration of an independent current measurement 800 according to an embodiment of the disclosure. FIG. 9 is an illustration of total current derivation 900 in the independent current measurement of FIG. 8 according to an embodiment of the disclosure.

A plurality of sensor coils 804/814 are configured to receive an actuation current 426/428 that actuates one of the actuation coils 422/424 respectively. The sensor coils 804/814 may be electrically independent from circuitry generating current the sensor coils 804/814 are measuring, so that a common electrical anomaly does not cause an erroneous current such as the erroneous current 708, in parallel with corrupting a measurement applied as a feedback parameter to another actuator coil controller.

A magnetic core 808/816 is configured to receive the magnetic flux 818/820 from the sensor coils 804/814 respectively.

At least one magnetic flux sensor 802/812 is coupled to the magnetic core 808/816 and is configured to measure the measured total coil current 462. The at least one magnetic flux sensor 802/812 may comprise, for example but without limitation, a Hall-effect sensor, or other sensor. The measured total coil current 462 (current-sum feedback value) may be derived in a number of ways. The measured total coil current 462 should be measured in a way that is electrically independent from the devices and circuitry that are controlling the current (unless another separate means of protection is provided to address the anomaly of that common device or circuitry).

As explained above, this is so that a common electrical anomaly does not cause erroneous current, in parallel with corrupting the measurement applied as the feedback parameter to the other actuator coil controller. For example, the system 400 should avoid an anomaly that causes erroneous current to flow through the actuation coil 1 (422) and corrupts the total current measurement used in the actuator coil controller 2 (408).

In FIGS. 8 and 9, each of the multiple controllers such as the actuator coil controllers 406 and 408 (see FIG. 4) measure each other's actuator coil current through an electrically independent means to measure a respective adjacent coil current and sums the respective adjacent coil current with a respective local coil current to create the measured total coil current 462 as the feedback parameter.

For example, the actuator coil controller 406 measures its own local coil current (measured coil current 826) such as the coil current 426 of the actuator coil 422, measures an adjacent coil current (measured coil current 828) such the coil current 428 of the actuator coil 424, and sums the coil current 428/828 with the coil current 426/826 to create the measured total coil current 902/462 as the feedback parameter.

Similarly, the actuator coil controller 408 measures its own local coil current (measured coil current 828) such as the coil current 428 of the actuator coil 424, measures an adjacent coil current (measured coil current 826) such the coil current 426 of the actuator coil 422, and sums the coil current 428/828 with the coil current 426/826 to create the measured total coil current 904/462 as the feedback parameter.

An independent measurement is accomplished in this example by the magnetic flux sensors 802/812 in which the current 426/428 flows through the sensor coils 804/814 respectively and generate respective magnetic flux 818/820 which is measured in respective gap 806/810 in the respective magnetic core 808/816.

Figure 10:
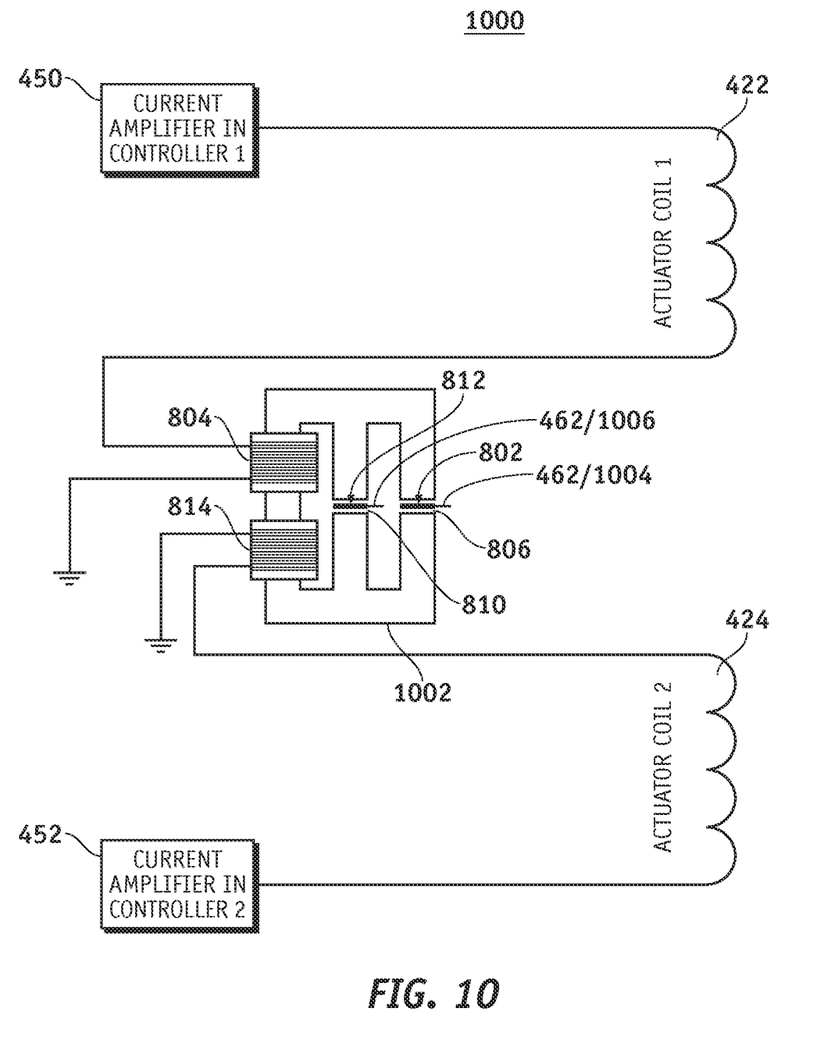
FIG. 10 is an illustration of a total current measurement according to an embodiment of the disclosure.

In addition, depending on a type of the actuator 502, embodiments may independently measure or derive the measured total coil current 462 (or a close approximation) using the actuation coils 422/424 directly, rather than installing external sensor coils 804/814 dedicated for measurement purposes, as shown in FIG. 10.

FIG. 10 is an illustration of a total current measurement 1000 according to an embodiment of the disclosure. FIG. 10 shows another example, in which the measured total coil current 462 is measured by magnetically summing the magnetic flux 818/820 (FIG. 8) generated by two sensor coils 804/814.

The two actuator coil controllers 406 and 408 (FIG. 4) measure the total coil current 462 by magnetically summing the magnetic flux 818/820 generated by the two sensor coils 804/814. An independent measurement is accomplished in this example by the magnetic flux sensor 802/812 in which the current 426/428 flows through the sensor coil 804/814 and generates the magnetic flux 818/820, a sum (1004/462 and 1006/462) of which is measured respectively in the gap 806 and 810 in the core 1002.

The methods in FIGS. 8-11 may be expanded to derive the measured total coil current 462 for other levels of redundancy (e.g., triple, quadruple, etc.).

Figure 11:
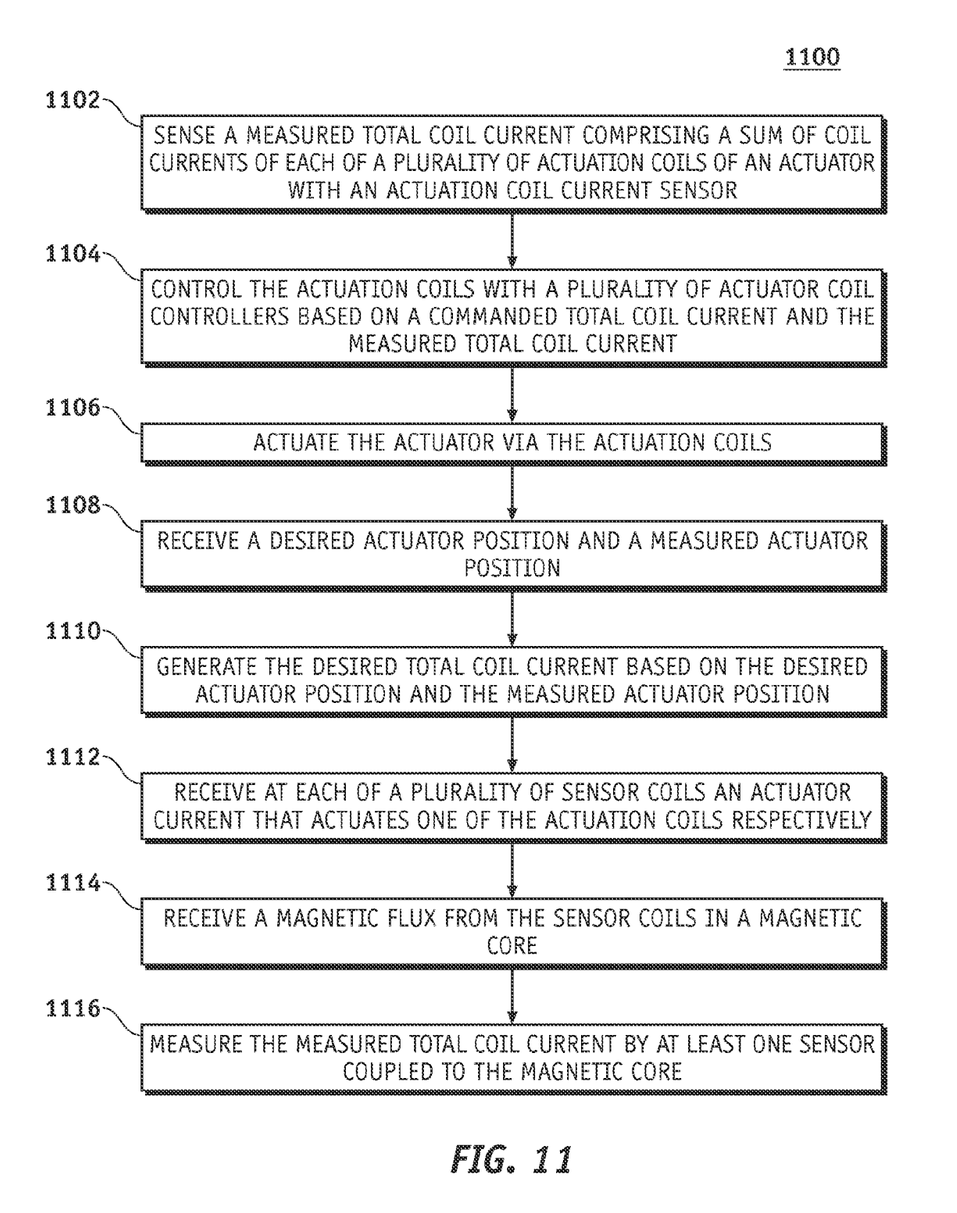
FIG. 11 is an illustration of an exemplary flowchart showing a process for fault suppression in an actuator controller according to an embodiment of the disclosure.

FIG. 11 is an illustration of an exemplary flowchart showing a process 1100 for suppression of a non-optimality in an actuator coil controller according to an embodiment of the disclosure. The various tasks performed in connection with process 1100 may be performed mechanically, by software, hardware, firmware, a computer-readable medium having computer executable instructions for performing the process method, or any combination thereof. It should be appreciated that process 1100 may include any number of additional or alternative tasks, the tasks shown in FIG. 11 need not be performed in the illustrated order, and process 1100 may be incorporated into a more comprehensive procedure or process having additional functionality not described in detail herein.

For illustrative purposes, the following description of process 1100 may refer to elements mentioned above in connection with FIGS. 4-5, and 7-10. In some embodiments, portions of the process 1100 may be performed by different elements of the system 400-500 such as: outer feedback control loop 418/420/508, the inner feedback control loop 430/432/506, the current amplifier 450/452/522, the actuation coils 422/424/526, the sensor coils 804/814, the magnetic flux sensor 802/812, etc. Process 1100 may have functions, material, and structures that are similar to the embodiments shown in FIGS. 4-5 and 7-10. Therefore common features, functions, and elements may not be redundantly described here.

Process 1100 may begin by sensing a measured total coil current such as the measured total coil current 462 comprising a sum of coil currents of each of a plurality of actuation coils such as the actuation coils 422/424 of an actuator such as the actuator 402 with an actuation coil current sensor such as the actuation coil current sensor 460 (task 1102).

Process 1100 may then continue by controlling the actuation coils 422/424 with a plurality of actuator coil controllers such as the actuator coil controllers 406/408 based on a commanded total coil current such as the commanded total coil current 436/438 and the measured total coil current 462 (task 1104). Controlling the actuation coils 422/424 with the actuator coil controllers 406/408 may be based on a difference (current-sum difference) between the commanded total coil current 436/438 and the measured total coil current 462.

Process 1100 may then continue by actuating the actuator 402 via the actuation coils 422/424 (task 1106).

Process 1100 may continue by receiving a desired actuator position such as the desired output 414/416 and a measured actuator position such as the measured output 410/412 (task 1108).

Process 1100 may continue by generating the commanded total coil current 436/438 based on the desired actuator position such as the desired output 414/416 and the measured actuator position such as the measured output 410/412 (task 1110).

Process 1100 may continue by receiving at each of a plurality of sensor coils such as sensor coils 804/814 an actuator current such as the actuator current 426/428 that actuates one of the actuation coils 422/424 respectively (task 1112).

Process 1100 may continue by receiving a magnetic flux such as the magnetic flux 818/820 from the sensor coils 804/814 in a magnetic core such as the magnetic core 808/816 (task 1114).

Process 1100 may continue by measuring the measured total coil current 462 by at least one sensor such as the magnetic flux sensor 802/812 coupled to the magnetic core 808/816 (task 1116).

In this way, a system and methods are provided for suppressing anomaly in an actuator.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 4-5 and 8-10 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A redundant current-sum feedback actuator system comprising:
   an actuator comprising a plurality of actuation coils configured to actuate the actuator;
   at least one actuation coil current sensor configured to determine a measured total coil current, the measured total coil current comprising a sum of coil currents flowing through each of the plurality of actuation coils; and
   a plurality of actuator coil controllers each configured to independently control a respective actuation coil of the plurality of actuation coils based on a current sum-difference between a desired total coil current and the measured total coil current.

2. The redundant current-sum feedback actuator system of claim 1, wherein each of the plurality of actuator coil controllers comprises a current amplifier, and wherein each of the plurality of actuator coil controllers is configured to:
   determine a command for a respective current amplifier based on the current sum-difference; and
   provide the command to the current amplifier to control the actuator.

3. The redundant current-sum feedback actuator system of claim 1, wherein the desired total coil current comprises a difference between a desired actuator output and a measured actuator output.

4. The redundant current-sum feedback actuator system of claim 3, further comprising a plurality of independent outer control loops each configured to:
   receive the desired actuator output and the measured actuator output; and
   determine the desired total coil current based on the desired actuator output and the measured actuator output.

5. The redundant current-sum feedback actuator system of claim 1, configured such that an erroneous current through one of the plurality of actuation coils causes an opposing current to flow in another one of the plurality of actuation coils and creates a magnetic flux opposing the erroneous current.

6. The redundant current-sum feedback actuator system of claim 1, wherein the actuation coil current sensor is electrically independent from the plurality of actuator coil controllers, such that an electrical anomaly affecting one or more of the plurality of actuator coil controllers does not corrupt the determining of the measured total coil current.

7. The redundant current-sum feedback actuator system of claim 6, wherein the at least one actuation coil current sensor comprises a plurality of sensor coils each configured to receive an actuator current that flows through a respective one of the plurality of actuation coils, and wherein the at least one actuation coil current sensor is configured to determine the measured total coil current by summing magnetic flux generated by the plurality of sensor coils.

8. The redundant current-sum feedback actuator system of 6, wherein the at least one actuation coil current sensor is configured to derive the measured total coil current using the plurality of actuation coils.

9. The redundant current-sum feedback actuator system of claim 1, wherein each of the plurality of actuator coil controllers is configured to provide a control current, and wherein each control current directly affects the other control currents electromagnetically, such that an erroneous control current is actively and immediately opposed by the other control currents.

10. A redundant current-sum feedback actuator controller comprising:
    an inner feedback control loop configured to:
      receive a desired total coil current and a measured total coil current, the measured total coil current comprising a sum of coil currents flowing through each of a plurality of actuation coils, and
      independently control a respective actuation coil of the plurality of actuation coils based on a current sum-difference between a desired total coil current and the measured total coil current.

11. The redundant current-sum feedback actuator controller of claim 10, wherein the desired total coil current comprises a difference between a desired actuator output and a measured actuator output.

12. The redundant current-sum feedback actuator controller of claim 11, further comprising an outer feedback control loop configured to:
    receive the desired actuator output and the measured actuator output; and
    determine the desired total coil current based on the desired actuator output and the measured actuator output.

13. The redundant current-sum feedback actuator controller of claim 10, further comprising:
    a sensor coil configured to receive an actuator current that flows through another one of the plurality of actuation coils that the inner feedback control loop is not controlling and generate a magnetic flux in a core, and
    a magnetic flux sensor configured to sense the generated magnetic flux,
    wherein the measured total coil current is determined based at least on the sensed magnetic flux.

14. The redundant current-sum feedback actuator controller of claim 10, wherein the redundant current-sum feedback actuator controller controls an aircraft flight control surface.

15. A method for suppressing non-optimality in an actuator control system, the method comprising:
- determining a measured total coil current, the measured total coil current comprising a sum of coil currents flowing through each of a plurality of actuation coils of an actuator, and
- independently controlling the plurality of actuation coils with a plurality of actuator coil controllers based on a current-sum difference between a desired total coil current the measured total coil current.

16. The method of claim 15, wherein the desired total coil current comprises a difference between a desired actuator output and a measured actuator output.

17. The method of claim 16, further comprising:
- receiving the desired actuator output and the measured actuator output; and
- determining the desired total coil current based on the desired actuator output and the measured actuator output.

18. The method of claim 15, further comprising deriving the measured total coil current using the plurality of actuation coils.

19. The method of claim 15, wherein determining the measured total coil current comprises:
- receiving, by each of a plurality of sensor coils, an actuator current that actuates a respective actuation coil of the plurality of actuation coils; and
- summing magnetic flux generated by the plurality of sensor coils.

20. The method of claim 15, wherein the actuator comprises an actuator for an aircraft flight control surface.

* * * * *